A. D. ROSS.
APPARATUS FOR MAKING EGG SHAKES.
APPLICATION FILED MAY 18, 1911.
1,001,451.
Patented Aug. 22, 1911.
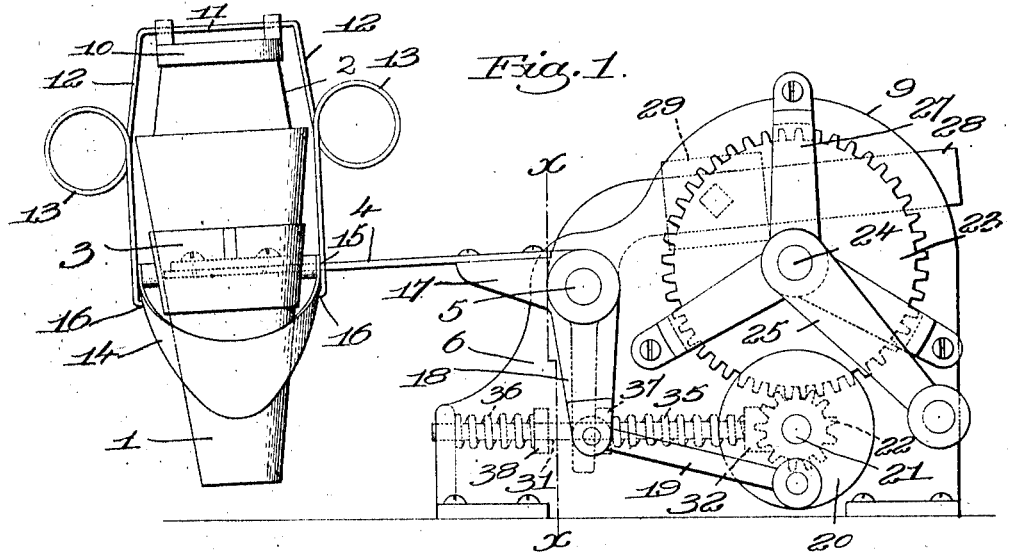
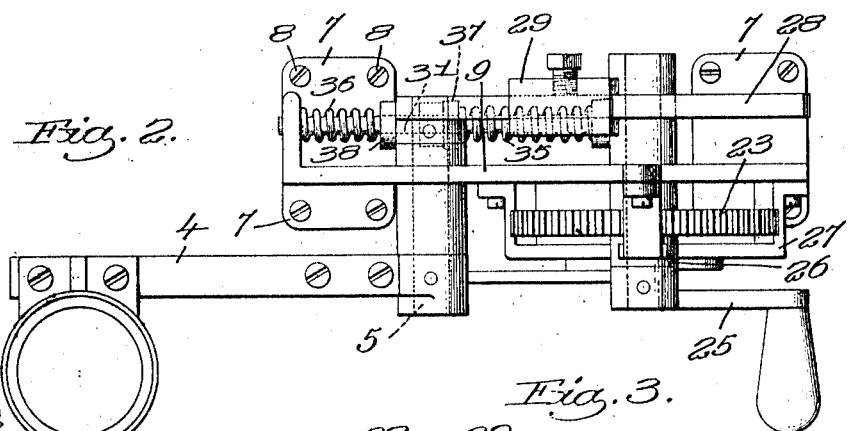
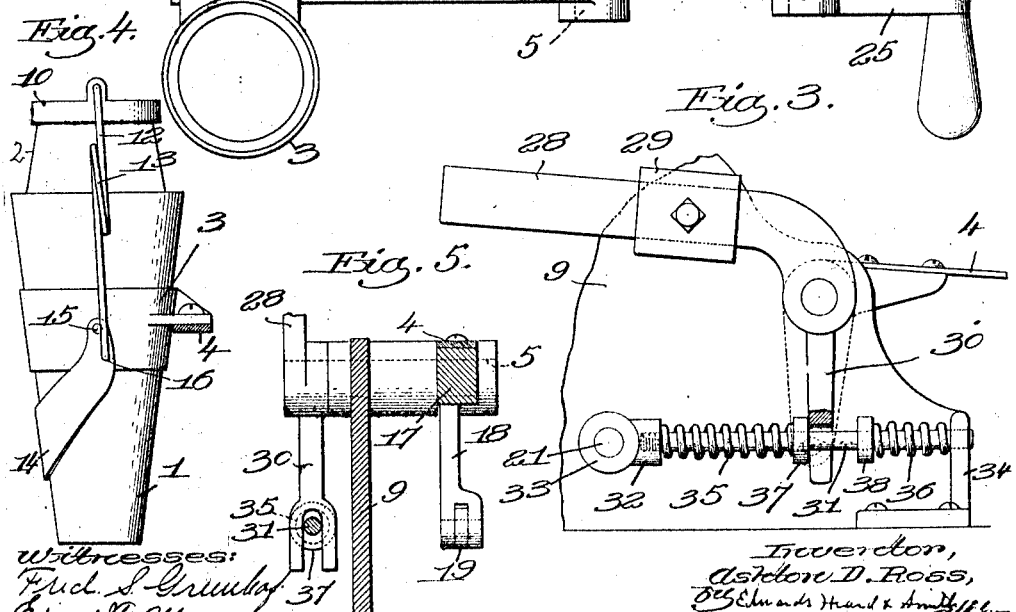

UNITED STATES PATENT OFFICE.

ASHTON D. ROSS, OF FITCHBURG, MASSACHUSETTS.

APPARATUS FOR MAKING EGG-SHAKES.

1,001,451.　　　　Specification of Letters Patent.　　Patented Aug. 22, 1911.

Application filed May 18, 1911. Serial No. 628,025.

*To all whom it may concern:*

Be it known that I, ASHTON D. ROSS, a citizen of the United States, residing at Fitchburg, county of Worcester, and State of Massachusetts, have invented an Improvement in Apparatus for Making Egg-Shakes, of which the following description, in connection with the accompanying drawing, is a specification, like characters on the drawing representing like parts.

This invention relates to an apparatus for making so-called egg shakes, and has for its object to provide a novel apparatus adapted to rapidly and thoroughly mix the egg, milk, and other ingredients, in such a way that the egg will be thoroughly broken up and completely mixed with the other ingredients, and to provide a construction wherein the cup or other receptacle is given a movement of the same character as that given to the cup by an operator when he makes the egg shake by hand; and further to provide a machine for this purpose which is comparatively simple and inexpensive to manufacture and can be easily operated.

Referring to the drawings wherein I have shown one embodiment of my invention, Figure 1 is a side view of an apparatus made in accordance with the invention; Fig. 2 is a top plan view; Fig. 3 is a view of the cushion spring; Fig. 4 is a view showing the clamp for clamping the cover on the cup; Fig. 5 is a section on the line $x$—$x$, Fig. 1.

1 designates the cup or other receptacle of usual form in which the ingredients are mixed, and 2 the cover for the cup. At most soda fountains the egg, milk and other ingredients are placed in the cup 1 and the cover 2 is applied thereto and then the attendant at the soda fountain gives the cup a violent shaking in his hands to mix the ingredients. As stated above my apparatus is adapted to produce substantially the same shaking motion of the cup 1 as that which is given by the operator. The cup 1 is adapted to be sustained in a suitable holder 3 which is sustained on a flexible or resilient arm 4 that in turn is mounted on a rock-shaft 5 journaled in bearings in a suitable frame 6. Said frame is preferably constructed so that it can be readily secured to a table, counter, or other surface, and it is shown as provided with the feet portion 7 to rest on the table and through which screws 8 or other fastening means may be inserted, and a vertical web 9 adapted to support the operating parts as will be presently described.

The cover is held in position by means of a clamping member 10 which is shown as pivotally sustained on the bail 11, the arms 12 of which are shown as provided with the loops 13 which furnish a certain amount of give or resiliency to the bail. This bail can conveniently be made of wire bent into the proper shape. The ends of the arm 12 of the bail are pivotally mounted in a locking member 14 which is pivoted to the holder 3, as at 15, the point 16 where the arms engage the locking member being eccentric to the points 15. After the cover 2 is applied to the cup 1 the bail 11 is swung into operative position with the clamp 10 engaging the top of the cover and then the locking member 14 is swung downwardly into the full line position Fig. 4 thereby firmly clamping the cover to the cup. When the locking member occupies said full line position the points 16 where the bail 11 is connected thereto pass by the pivotal point 15 of the bail so that when the locking member 14 strikes the cup the device is securely locked in place. When the locking member 14 is lifted, however, the cover is unclamped and can be readily removed.

Suitable means are provided for oscillating the rock-shaft 5 thereby to give the cup 1 a violent shaking and because of the resiliency of the arm 4 the movement which the cup will have is very similar to that which is given by hand. While it is possible to operate the rock shaft 5 in various ways without departing from my invention I prefer the construction herein illustrated, as it has been found to be one which can be easily operated. The arm 4 is shown as connected to a member 17 which is fast on the rock shaft 5 and which is provided with an arm 18 that is connected by a link 19 with a crank disk 20 mounted on a stud shaft 21. This crank disk has rigid therewith a pinion 22 which meshes with and is driven by a driving gear 23 carried on a shaft 24 that is journaled in the frame, said shaft having a crank handle 25 fast thereto by which it may be turned. In the illustrated embodiment of my invention the shaft 4 is sustained partly in bearings formed in the web 9 and partly in bearings 26 carried by the spider 27, the gear 23 being confined between the spider and the web 9. Any other 'way' of securing the driving gear to the frame might be employed, however, without departing from my invention. By turning the crank handle 25 the crank disk 20 will be rapidly rotated, thus oscillating the member 17 and giving to the cup 1 the required oscillatory or shaking movement.

The rock shaft 5 is shown as having fast thereto an arm 28 provided with an adjustable counterweight 29, which counterweight acts as a balance for the weight of the cup 1 and its contents.

In order to make the operation of the device easy and smooth notwithstanding the shaking movement of the cup 1 and its contents I have provided a combined cushioning and reversing device which not only cushions the oscillating movement of the rock shaft 5, but also helps to reverse the direction of movement of the rock shaft at the end of each oscillation. As herein shown the rock shaft 5 has fast therewith an arm 30, the lower end of which straddles a rod 31 carried by the frame, said rod being herein shown as supported at one end in a boss 32 formed on the bearing 33 for the shaft 21 and supported at the other end in a flange 34 formed on the frame.

35 and 36 are two springs which encircle the rod 31, said springs being situated either side of the arm 30. I will preferably interpose sliding collars 37 and 38 between the springs and the arm, although this is not essential. These springs are so positioned that when the cup-supporting arm 4 swings upwardly, the arm 30 will engage the collar 38 just before the cup reaches the upper limit of its movement so that during the last part of such movement the spring 36 will be compressed and thereby act to assist in bringing the cup to rest, and at the same time assist in starting the parts in the reverse direction. Similarly when the cup approaches the lower limit of its movement the arm 30 will engage the collar 37 and thus compress the spring 35, which spring will not only assist in bringing the parts to rest, but will by virtue of its action assist in starting the parts in the opposite direction. I propose to make the spring 35 somewhat heavier than the spring 36 because a greater force is required to cushion and reverse the movement of the cup at the lower limit of its motion than is required at the upper limit of its movement because of the fact that the action of gravity assists in the reversing movement at the top of the stroke, but acts against the reversing movement at the bottom of the stroke. By the use of these springs 35 and 36 I find that it is possible to operate the machine very rapidly and with great ease for the force necessary to reverse the movement of the cup and its contents is secured largely by the action of the springs 35, 36. While the machine is in operation the driving wheel will operate smoothly and the operator will feel no particular jerky or jarring sensation due to the reversing of the parts.

The resilient arm 4 combined with the method of cushioning the reverse gives the cup 1 such an oscillatory motion that the contents thereof will be thoroughly mixed.

My device is comparatively simple to manufacture and can be easily operated by anyone.

Having described my invention, what I claim as new and desire to secure by Letters Patent is:—

1. In an apparatus for making egg shakes, the combination with a pivotally-mounted arm, of a cup holder sustained thereby, means to give the arm an oscillatory motion, and a combined cushioning and reversing means to cushion the movement of the arm as it approaches the end of its stroke in each direction and to assist in reversing its movement.

2. In an apparatus for making egg shakes, the combination with a pivotally-mounted cup-holding arm, of means to give said arm an oscillatory motion, and a combined cushioning and reversing spring acting to cushion the movement of the arm as it approaches the end of its stroke and to assist in reversing its movement.

3. In an apparatus for making egg shakes, the combination with a pivotally-mounted cup-holding arm, of means to give said arm an oscillatory motion, and two springs acting to cushion the movement of the arm as it reaches the end of its stroke and to assist in reversing its movement.

4. In an apparatus for making egg shakes, the combination with a pivotally-mounted resilient arm, of a cup holder sustained thereby, means to give the arm an oscillatory motion, and a combined cushioning and reversing means to cushion the movement of the arm as it approaches the end of its stroke in each direction and to assist in reversing its movement.

5. In an apparatus for making egg shakes, the combination with a frame, of a rock shaft journaled therein, a resilient cup-holding arm mounted on the rock shaft, means for oscillating said rock shaft, a forked arm fast to said shaft, a rod embraced by the fork of the arm, and two springs on the rod on either side of the fork for cushioning and reversing the movement of the cup-holding arm.

6. In an apparatus for making egg shakes, the combination with a pivotally-mounted arm, of means to oscillate said arm, a cup holder sustained by the arm, a locking member pivoted to said holder, a clamping bail pivoted to said locking member eccentrically, and a cover clamp sustained by said bail.

7. In an apparatus for making egg shakes, the combination with a pivotally-mounted arm, of means to oscillate said arm, a cup holder sustained by the arm, a locking member pivoted to said holder, a clamping bail pivoted to said locking member eccentrically and having elastic arms, and a cover clamp sustained by said bail.

In testimony whereof, I have signed my name to this specification, in the presence of two subscribing witnesses.

ASHTON D. ROSS.

Witnesses:
WALTER A. DAVIS,
LUCY A. HAYWARD.